(12) United States Patent
McDonald et al.

(10) Patent No.: US 8,443,941 B2
(45) Date of Patent: May 21, 2013

(54) COOLING/LUBRICATING DEVICE FOR MACHINE TOOL FEED SHAFT

(75) Inventors: John McDonald, West Sacramento, CA (US); Clint Gabrielson, West Sacramento, CA (US)

(73) Assignee: Mori Seiki Co., Ltd., Yamato-koriyama, Nara (JP)

( * ) Notice: Subject to any disclaimer, the term of this patent is extended or adjusted under 35 U.S.C. 154(b) by 1038 days.

(21) Appl. No.: 12/048,757

(22) Filed: Mar. 14, 2008

(65) Prior Publication Data
US 2009/0229919 A1 Sep. 17, 2009

(51) Int. Cl.
*F01M 1/00* (2006.01)
(52) U.S. Cl.
USPC .................................................... 184/6.26
(58) Field of Classification Search
USPC ............... 184/6.11, 6.12, 6.14, 6.26, 6.28
See application file for complete search history.

(56) References Cited

U.S. PATENT DOCUMENTS

| | | | |
|---|---|---|---|
| 3,637,049 A * | 1/1972 | Butterfield et al. | 184/6.12 |
| 5,921,349 A * | 7/1999 | Sato et al. | 184/6.14 |
| 5,927,863 A * | 7/1999 | De Bock | 384/468 |
| 6,599,066 B1 * | 7/2003 | Koike et al. | 409/135 |
| 7,065,954 B2 * | 6/2006 | Labala | 60/39.465 |
| 7,374,019 B2 * | 5/2008 | Kosugi et al. | 184/6.14 |
| 2007/0137333 A1 * | 6/2007 | Geissler et al. | 74/89.23 |

FOREIGN PATENT DOCUMENTS

| | | |
|---|---|---|
| JP | 62-32256 U | 2/1987 |
| JP | 4-80265 B2 | 12/1992 |
| JP | 2001-108052 A | 4/2001 |
| JP | 3448732 B2 | 9/2003 |
| JP | 3721264 B2 | 11/2005 |
| JP | 2007-139190 A | 6/2007 |
| WO | 01/31215 A1 | 5/2001 |

* cited by examiner

*Primary Examiner* — William E Dondero
*Assistant Examiner* — Robert T Reese
(74) *Attorney, Agent, or Firm* — Westerman, Hattori, Daniels & Adrian, LLP

(57) ABSTRACT

By using the same liquid for cooling and lubricating a feed shaft, a simpler structure is obtained, thereby allowing easier maintenance. A feed shaft that is rotatably supported at one end thereof moves a slide of a machine tool. The feed shaft is supported by a support member via a bearing. A pipe is fitted to the feed shaft, and a pathway space is provided allowing the reciprocal flow of the cooling/lubricating liquid in the axial direction. Some of the cooling/lubricating liquid supplied via the support member to the feed space passes through the pathway space as cooling liquid, cools the feed shaft, and is held in a discharge space. At the same time, some of the cooling/lubricating liquid flows, as lubricating liquid, into the bearing, is discharged, and is held in a discharge space. The cooling/lubricating liquid in the discharge space that has absorbed the heat of the structure is immediately discharged out of the support member.

4 Claims, 3 Drawing Sheets

COOLING/LUBRICATING DEVICE FOR MACHINE TOOL FEED SHAFT

BACKGROUND OF THE INVENTION

1. Field of the Invention

The present invention relates to a cooling/lubricating device for a machine tool, and in particular to a cooling/lubricating device of a machine tool feed shaft for cooling and lubricating the feed shaft of ball screw or the like and bearing in machine tools of machining centers or the like.

2. Description of the Related Art

In numerically controlled (NC) machine tools of machining centers or the like, the feed shafts in ball screws or rotating drives of main spindles and the like have attained high speeds recently, and the evolution of heat leads to elevated temperatures, resulting in thermal deformation and thermal displacement. Cooling liquids or the like are therefore provided to cool rotating shafts and bearings in particular so as to prevent spindles, feed shafts, and the like from heating up. In addition to such cooling, it is also necessary to properly lubricate the bearings of rotating shafts.

Because of the considerable increase in the temperature of spindles, cooling and lubricating measures are taken in response to the increase in the spindle rotating speed sooner than with the feed system. However, given the increasingly faster speeds of feed shafts recently, there is a need to ensure stable operation in response to such higher speeds. For example, in machining centers and the like in which light alloys such as aluminum alloys are machined at high speeds, it is necessary to ensure the high speed feed of the three X, Y, and Z shafts which are feed shafts.

There is thus demand for structures that would supply a cooling liquid to the feed shaft in order to prevent increases in temperature in the same manner as for main spindles, and there is also demand for effective cooling and lubricating of bearings, where feed shafts rotate and are supported, in response to higher speeds. Various types of cooling measures have conventionally been adopted to a certain extent to deal with feed shafts related to machine tools. The most often used cooling method is to dispose a pipe along the entire length through the center of the feed shaft, form spaces that are divided on the inner and outer peripheral surfaces of the pipe, and feed a cooling liquid into the spaces, bringing about cooling through the circulation of the liquid by its supply and discharge through one end of the feeding shaft.

The portion, where the cooling liquid is supplied and discharged, is the support that supports the feed shaft at one end of the feed shaft. In terms of cooling technique for these structures, a ball threaded cooling structure suitable for lathes, for example, is known as a technique preceding the recent trend toward greater speeds (see Japanese Laid-Open Utility Model Application 62-32256 for example). Cooling structures which can be adapted to transfer mechanisms such as machine tool tables are also known (see Japanese Patent Publication 4-80265 and Japanese Patent No. 3448732 and Japanese Laid-Open Patent Application 2007-139190 for example). Theses are simple structures which are intended to deal with the higher fast-forward speeds of transfer mechanisms, and have also been built as devices with better maintenance to prevent cooling fluid leakage.

Examples which have been adapted to machine tools such as large-scale machining centers are also known. In large-scale machining centers, the overall length of the structure is longer, and the feed shaft is also necessarily longer. The resulting increase in the level of thermal displacement is considered a problem. Examples of measures taken include cooling devices in which a jacket is formed at the rear of the feed shaft to provide a cavity, and a cooling liquid is supplied and discharged through the jacket (see Japanese Laid-Open Patent Application 2001-108052 for example).

All of these conventional examples are structures in which the cooling liquid is supplied and discharged at the same end of the feed shaft, and as such, maintenance becomes a consideration. In another known technique, the ball nut is cooled, and the same liquid passes into the bearing cone of the bearing through a through hole in the bore threading to cool the bearing (see Japanese Patent No. 3721264 for example).

In terms of lubrication, meanwhile, there are various ways to lubricate the bearings that support spindles, feed shafts, and the like. The bearing employed for feed shafts is a ball bearing. When the feed shaft rotation accelerates, the bearing becomes a heating element, causing the feed shaft to axially expand. It thus becomes necessary to cool the feed shaft as noted above, but proper lubrication is essential at the same time.

Generally, in terms of lubrication, lubricants are individually supplied while the flow to the bearing is properly controlled, to ensure greater longevity. A known example of a lubricating technique for machine tools is a structure in which a rotating shaft pre-coated or pre-filled with a lubricant is used, the lubricant in the rotating shaft is released through centrifugal force, so that the lubricant is supplied to the bearing (see International Patent Application WO 01/031215 for example).

As described above, in conventional methods for cooling feed shafts, the cooling liquid flows along the entire length of the feed shaft, and the cooling liquid is furthermore supplied to and discharged at the end of the shaft. It was noted above that there are various ways to lubricate the bearing that supports the feed shaft. However, the cooling and lubrication is done separately in virtually all the conventional techniques.

The cooling and lubricating are conventionally handled by different methods. Separate pathways are thus formed. Such a structure involves two systems that are different in some way, contributing to less favorable maintenance and greater costs. In the structure in Japanese Patent No. 3721264, the bearing is also cooled, but the structure is complicated because the cooling liquid flows through the bearing from the bearing cone side toward the bearing cup, a rotary joint is needed, and so forth. This is not a structure in which cooling is brought about by the flow of the cooling fluid along the central axis of the bearing upon the feed shaft being cooled by the reciprocal cooling liquid flow. The cooling effects are therefore not necessarily sufficient in structures where the cooling liquid is released on the bearing cup side through centrifugal force.

SUMMARY OF THE INVENTION

There is a need for a structure in which a cooling liquid and lubricant can be supplied and discharged at the same place for more effective cooling and lubrication, as well as a simpler structure that is easier to maintain. For structures where a cooling liquid and lubricating oil are supplied at the same place (location), a structure by which the lubricant is supplied in minute amounts is particularly desirable. The following are objects of the present invention, which was conceived to overcome the following problems of the prior art.

An object of the present invention is to provide a cooling/lubricating device for a feed shaft, for which the same liquid or gas include mist is used for cooling and lubrication, resulting in a simpler structure which is easier to maintain.

The following means are adopted to achieve the above objects of the invention.

The cooling/lubricating device for a machine tool feed shaft according to the present invention comprises:

a hollow feed shaft (1) on the outer circumference of which is formed a screw mating with a nut secured to a slide of the machine tool so as to feed the slide and which is rotatably supported at an end of the feed shaft;

a bearing (8) which rotatably supports the end of the feed shaft (1);

a support member (2), provided at the end of the feed shaft (1), for supporting the feed shaft (1) to be relatively rotated via the bearing (8);

a tube (16) which is disposed along the axis inside the hollow feed shaft (1) and which allows cooling lubricant to pass through pathway spaces formed inside the tube (16) and outside the tube (16);

a first cover member (9) which contours a feed space (12) holding the cooling lubricant fed into circumference of the feed shaft (1) at one side of the support member (2); and a second cover member (10) which contours a discharge space (13) holding the cooling lubricant to be discharged from circumference of the shaft (1) at the other side of the support member (2), a channel (27a, 8) for the cooling lubricant as lubricant flowing outside of the feed shaft (1) from the feed space (12) through the bearing (8) to the discharge space (13);

a channel (20,19) for the cooling lubricant as refrigerant flowing within the feed shaft (1) from the feed space (12) to the discharge space (13), wherein one part of the cooling lubricant held in the feed space (12) is allowed to flow as lubricant in the axial direction of the bearing (8) outside of the feed shaft (1) and held in the discharge space (13) and the other part of the cooling lubricant held in the feed space (12) is allowed to be circulated as refrigerant through the pathway spaces within the feed shaft (1) and held in the discharge space (13), so that the cooling lubricant as lubricant and the cooling lubricant as refrigerant flow through separate channels in a parallel manner respectively.

The cooling/lubricating device for a machine tool feed shaft of the second invention according to the first invention further comprises a regulating member (27, 40) for forming a prescribed gap (27a, 43) for supplying some of the cooling lubricant in the feed space (12) to the bearing (8) as a lubricant in a fixed amount.

The cooling/lubricating device for a machine tool feed shaft of the third invention according to the first invention, is characterized in that some of the cooling lubricant in the feed space (12) is fed in the axial direction of the bearing (8).

The cooling/lubricating device for a machine tool feed shaft of the fourth invention according to the second invention, is characterized in that the regulating member (27, 40) is a rotating member fixed to the feed shaft (1), and forms a prescribed gap/labyrinth (27a, 43) that is spaced apart a predetermined distance from a fixing member (9, 40).

The cooling/lubricating device for a machine tool feed shaft of the fifth invention according to the fourth invention is characterized in that a pathway (44) for discharging excess lubricant oil in the vicinity of the labyrinth (43) to the discharge space (13) is provided in the fixing member (41) in the vicinity the labyrinth (43).

As noted above, the same liquid is used for the refrigerant and the lubricant, allowing the high speed feed shaft to be effectively cooled and lubricated, with a simpler structure and lower costs.

DESCRIPTION OF THE PREFERRED EMBODIMENTS

Figure 1:
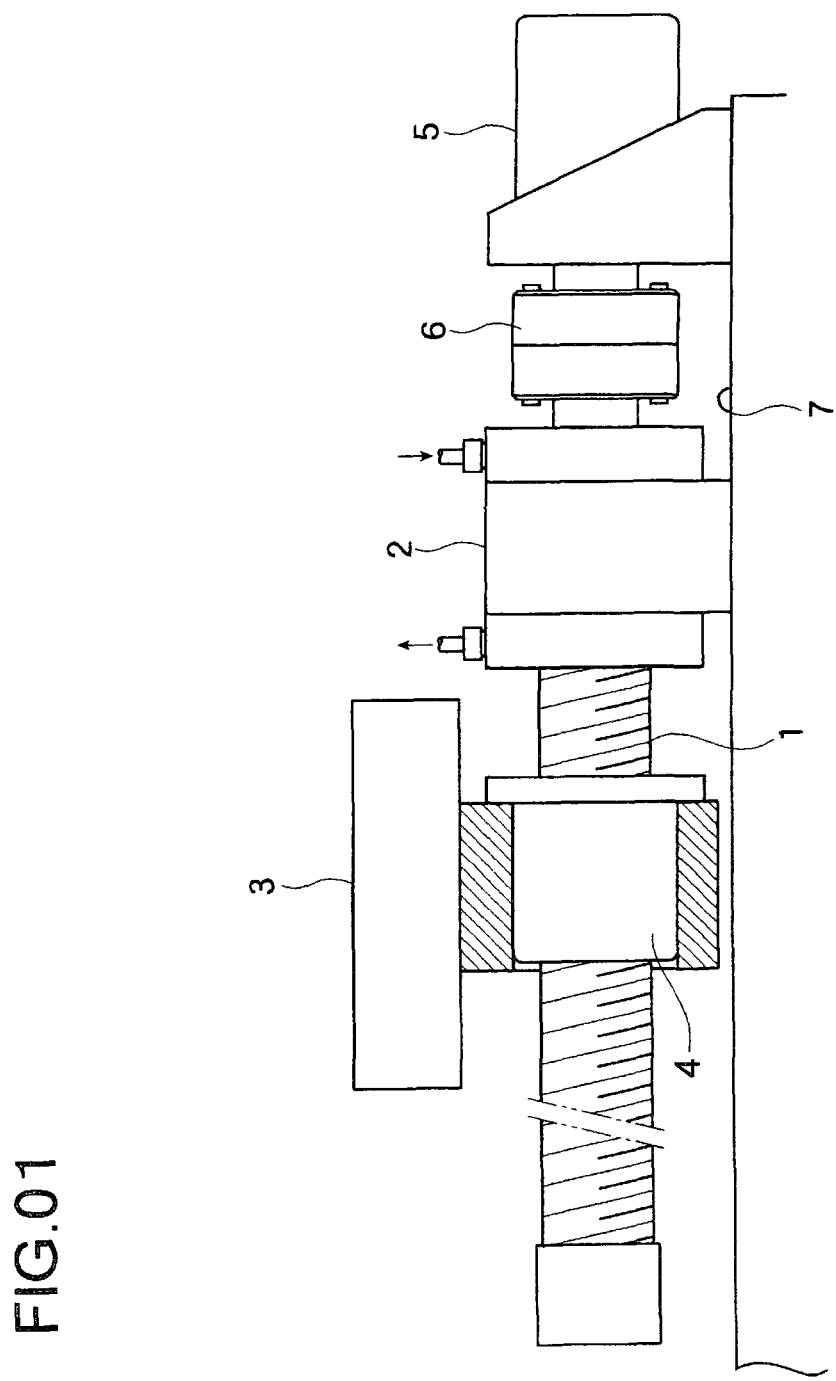
FIG. 1 is a schematic structural diagram of the feed shaft employing the cooling/lubricating device of the invention.
Figure 2:
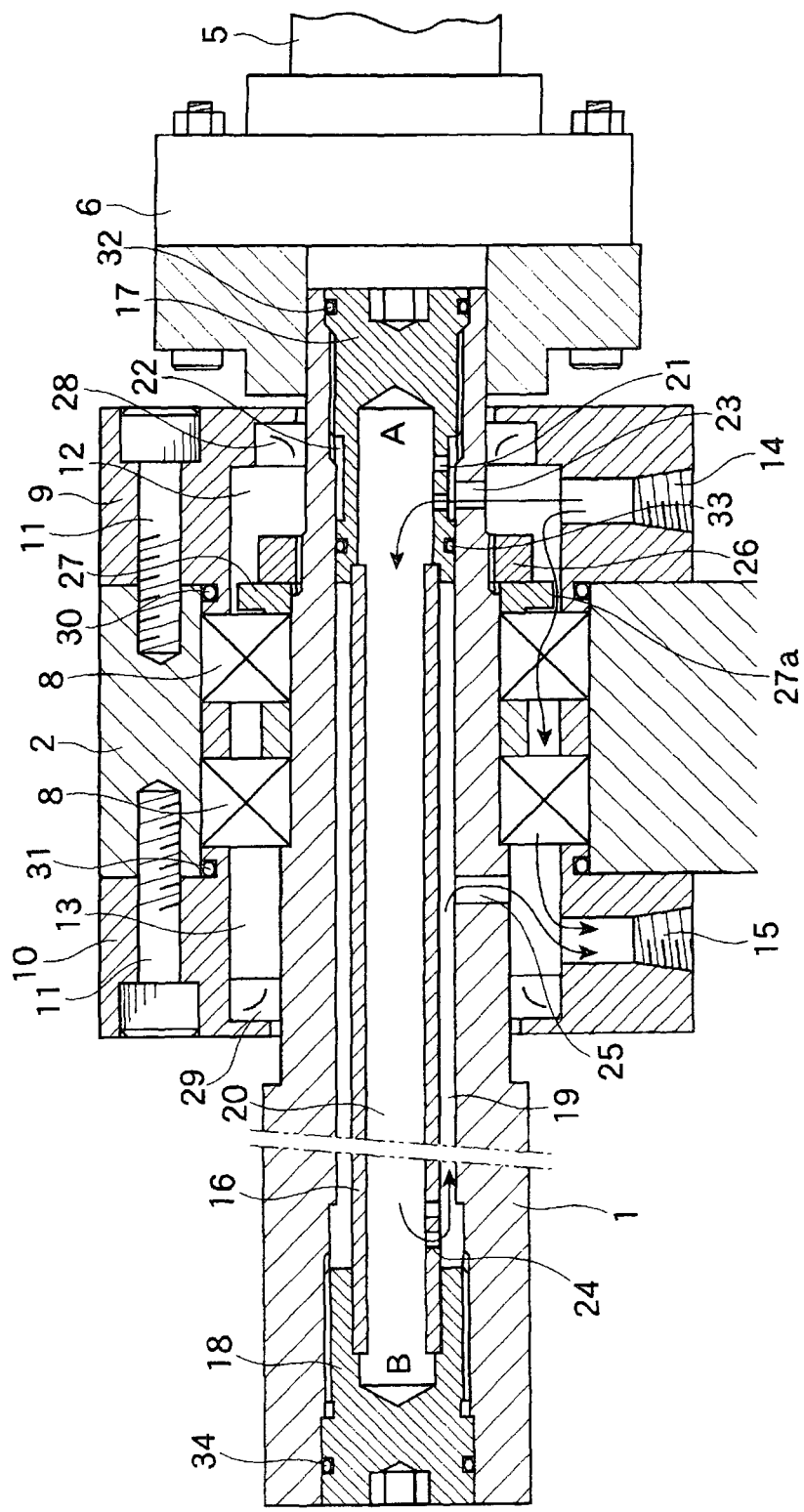
FIG. 2 is a cross section schematically illustrating details of the feed shaft illustrated in FIG. 1.

Embodiments of the invention are illustrated below based on the drawings. FIG. 1 is a schematic structural diagram of the feed shaft of a machine tool employing the cooling/lubricating device of the invention. FIG. 2 is a cross section schematically illustrating details of the feed shaft illustrated in FIG. 1. In the figures, the feed shaft (feed ball screw) 1 is rotatably supported by a support 2 fixed to one end. The other end is open, that is, unsupported. The intermediate portion of the feed shaft 1 is provided with a slide 3 that is driven by the feed shaft 1. The slide 3 may mean what is referred to as a table, saddle, ram, knee, tool rest, tool post, carriage, spindle head, or the like in machine tools.

The feed shaft 1 in this example is composed of a feed screw, such as a ball screw used in NC machine tools. As the structure and function are well-known, they will not be further elaborated. The slide 3 is, for example, a machining center table or the like. A nut 4 screwed onto the ball screw of feed shaft 1 is fixed to the slide 3. The nut 4 meshes with the feed shaft 1, so that the nut 4 moves in the direction of the center axis of the feed shaft 1 every time the feed shaft 1 rotates. The feed shaft 1 is rotatably supported via the bearing 8, and is rotatably driven by a servo motor 5. The feed shaft 1 is generally connected via a coupling 6 to the servo motor 5.

The slide 3 is only moved and guided in the direction of the center axis of the feed shaft 1 by the slideway (not shown). The feed shaft 1 is rotated so that the nut 4 which has been screwed on moves relatively reciprocally along the axial direction of the feed shaft 1. The slide 3 such as a table is fixed to the nut 4, allowing the slide 3 to be reciprocally moved by the rotation of the feed shaft 1. When the slide 3 is a machining center table, the support 2 will be a bracket fixed to a saddle 7, for example. FIG. 2 below illustrates the details.

The feed shaft 1 is free at one end, and the other end is rotatably supported by the support 2 via the bearing 8, as noted previously. Two ball bearings 8 are disposed in the support 2, rotatably bearing the feed shaft 1. A coupling 6 is attached to the end of the feed shaft 1 to connect it with the output shaft of the servo motor 5. A first cover member 9 and second cover member 10 are fixed to the support 2 by means of bolts 11 at both ends of the support 2.

A feed space 12 for holding the supplied cooling lubricant (referred to below as "cooling/lubricating liquid" in this embodiment) is formed between the first cover member 9 and bearing 8. A discharge space 13 for holding the discharged cooling/lubricating liquid is formed between the second cover member 10 and bearing 8. The first cover member 9 is provided with a feed port 14 for supplying the cooling/lubricating liquid to the feed space 12, which is connected by piping to an externally provided cooling/lubricating liquid tank (not shown).

A pump is internally housed in the cooling/lubricating liquid tank, resulting in a structure for forcibly injecting the cooling/lubricating liquid. The second cover member 10 is provided with a discharge port 15 for externally discharging cooling/lubricating liquid held in the discharge space 13, which is connected by piping to the cooling/lubricating liquid tank noted above. A tubular hollow which is an internal cavity is formed in the feed shaft 1, and a pipe 16 is disposed by being inserted and fixed concentrically with the feed shaft 1 in the hollow. The pipe 16 is axially restricted and fixed at the ends by two fixation supports, that is, at one end by a first fixation support 17 and at the other end by a second fixation support 18.

The pipe 16 is fixed by being sandwiched on both ends between the first fixation support 17 and second fixation support 18. An outer space 19 is formed between the outside diameter portion of the pipe 16 and the inside diameter portion of the feed shaft 1, and an internal space 20 is formed in the inside diameter portion of the pipe 16. The first fixation support 17 is partially hollow, and a connection hole 21 connecting the outside diameter portion and inside diameter portion is provided. A space in which a groove 22 has been provided is formed on the intermediate outside diameter portion of the first fixation support 17. A feed hole 23 is also formed in the feed shaft 1, so that the cooling/lubricating liquid in the feed space 12 is fed through the feed hole 23, groove 22, and connection hole 21 into the internal space 20.

A connection hole 24 connecting the external space 19 and internal space 20 is provided at the second fixation support 18 end of the pipe 16 itself. A discharge hole 25 is also provided in the feed shaft 1, so that the cooling/lubricating liquid in the internal space 20 can be held in the discharge space 13 via the connection hole 24, external space 19, and discharge hole 25. The bearing 8 is fixed by means of the nut 26 to the feed shaft 1, with a ring-shaped regulating member 27 disposed between the nut 26 and bearing 8.

The outside diameter portion of the regulating member 27 is attached at a predetermined clearance 27a from the first cover 9, resulting in a member for guiding a certain amount of the cooling/lubricating liquid in the feed space 12 through the gap distance to the bearing 8. This slight gap can be adjusted so that the selectively provided gap is formed by the rotating state of the bearing 8. That is, the magnitude of the outside diameter of the regulating member 27 can be altered to allow the predetermined clearance 27a to be modified. The amount of the cooling/lubricating liquid fed to the bearing 8 can be set depending on the magnitude of the predetermined clearance 27a.

As another method, the structure may be such that, in place of the predetermined clearance 27a, a plurality of through holes may be provided in the axial direction in the regulating member 27 to allow the cooling/lubricating liquid to flow through. On the axial end of the first cover 9 on the other side from the bearing 8, a first seal member 28 may be provided between the cover and the feed shaft 1 to prevent the cooling/lubricating liquid in the feed space 12 from leaking out. Similarly, a second seal member 29 may be provided on the second cover 10 on the other side from the bearing 8 between the cover and the feed shaft 1 to prevent the cooling/lubricating liquid in the discharge space 13 from leaking out.

O rings 30 and 31 are also provided as seals between the support 2 and the first and second covers 9 and 10 to prevent the cooling/lubricating liquid from leaking. The first fixation support 17 and second fixation support 18 are also sealed from the feed shaft 1 with O rings 32, 33, and 34 to prevent the cooling/lubricating liquid from leaking out.

The feed shaft 1 has the structure described above, wherein the cooling/lubricating liquid flows as described above to prevent thermal displacement when the feed shaft 1 is rotated at high speed during fast forward or the like, resulting in cooling and lubrication in the following manner. The cooling/lubricating liquid pre-cooled by the external tank is fed from the feed port 14 into the feed space 12. Some of the cooling/lubricating liquid in the feed space 12 flows as cooling liquid through the feed shaft 1 feed hole 23 and first fixation support 17 connection hole 21 to be guided into the internal space 20 provided the pipe 16 inside diameter portion.

The cooling/lubricating liquid guided to the internal space 20 flows from A in the direction of B, as shown in FIG. 2, along the central axis of the feed shaft 1, and the cooling/lubricating liquid that has reached the shaft end is guided through the pipe 16 connection hole 24, changing direction, into the external space 19. The cooling/lubricating liquid that has been guided into the external space 19 flows from B in the direction of A and is guided through the discharge hole 25 of the feed shaft 1 into the discharge space 13. As a result, some of the cooling/lubricating liquid supplied from the feed port 14 of the first cover 9 to the feed space 12 is guided, as cooling liquid for the feed shaft 1, through the feed hole 23, groove 22, and connection hole 21 into the internal space 20, flows from A in the direction of B as shown by the arrow in FIG. 2, passes through the connection hole 24, external space 19, and discharge hole 25, and is finally guided to the discharge space 13.

Meanwhile, some of the cooling/lubricating liquid in the feed space 12 is guided, as lubricating liquid, through the predetermined clearance 27a formed on the outer periphery of the regulating member 27 to the bearing 8. The lubricating liquid passing through the predetermined clearance 27a is limited to a certain flow rate, but a constant flow rate is supplied continuously in one direction, that is, the axial direction, functioning as a lubricating liquid. The lubricating liquid passing through the bearing 8 is directly guided to the discharge space 13 and mixed with the cooling/lubricating liquid that has been discharged as the cooling liquid above.

It need hardly be mentioned that the cooling/lubricating liquid passing through the bearing 8 functions as a cooling liquid, though described as a lubricating liquid. The cooling/lubricating liquid in the discharge space 13 absorbs the heat of the structure and heats up. The cooling/lubricating liquid held in the discharge space 13 thus is immediately returned continuously through the discharge port 15 to the externally provided tank. The returned cooling/lubricating liquid is cooled and cleaned, and can be reused as cooling/lubricating liquid.

The cooling/lubricating liquid that is used has cooling and lubricating properties, as previously described. Cooling liquids or lubricating liquids are generally used independently, but additives may be added to enhance the properties. For example, if the cooling/lubricating liquid is based on a lubricating liquid, the foaming properties, extreme pressure properties, anti-corrosion properties, wear resistance properties, antioxidant properties, viscosity index improving properties, and the like can be strengthened.

The invention is characterized in that the same cooling/lubricating liquid is used to cool and lubricate the feed shaft 1 by means of the axial flow of the liquid. In particular, the bearing 8 is a source of heat, in need of cooling, not to mention lubrication. The cooling/lubricating liquid also forcibly flows continuously. A cooling state is thus constantly maintained to prevent heat from becoming internally trapped.

The cooling/lubricating liquid was described as a liquid above, but the invention is not limited to liquids and may be a gas including lubricating liquid in the form of a mist. FIG. 2 also depicts a structure incorporating two bearings, but the invention is not limited to this structure and may be in the form of a structure with four, for example. The bearings may be the type that withstand radial loads as well as thrust loads, with a continuous axial flow of lubricating liquid.

In this embodiment, the support 2 is provided at only one end of the feed shaft 1, but when the feed shaft 1 is longer, supports 2 can be provided at both ends of the feed shaft 1. A cooling/lubricating device may also be provided in both supports 2. In such cases, the cooling and lubricating efficiency can be improved when the cooling lubricant flowing into the feed shaft 1 branches off into the supports 2. It need hardly be mentioned that the invention is not limited to the details of the embodiment described above.

Figure 3:
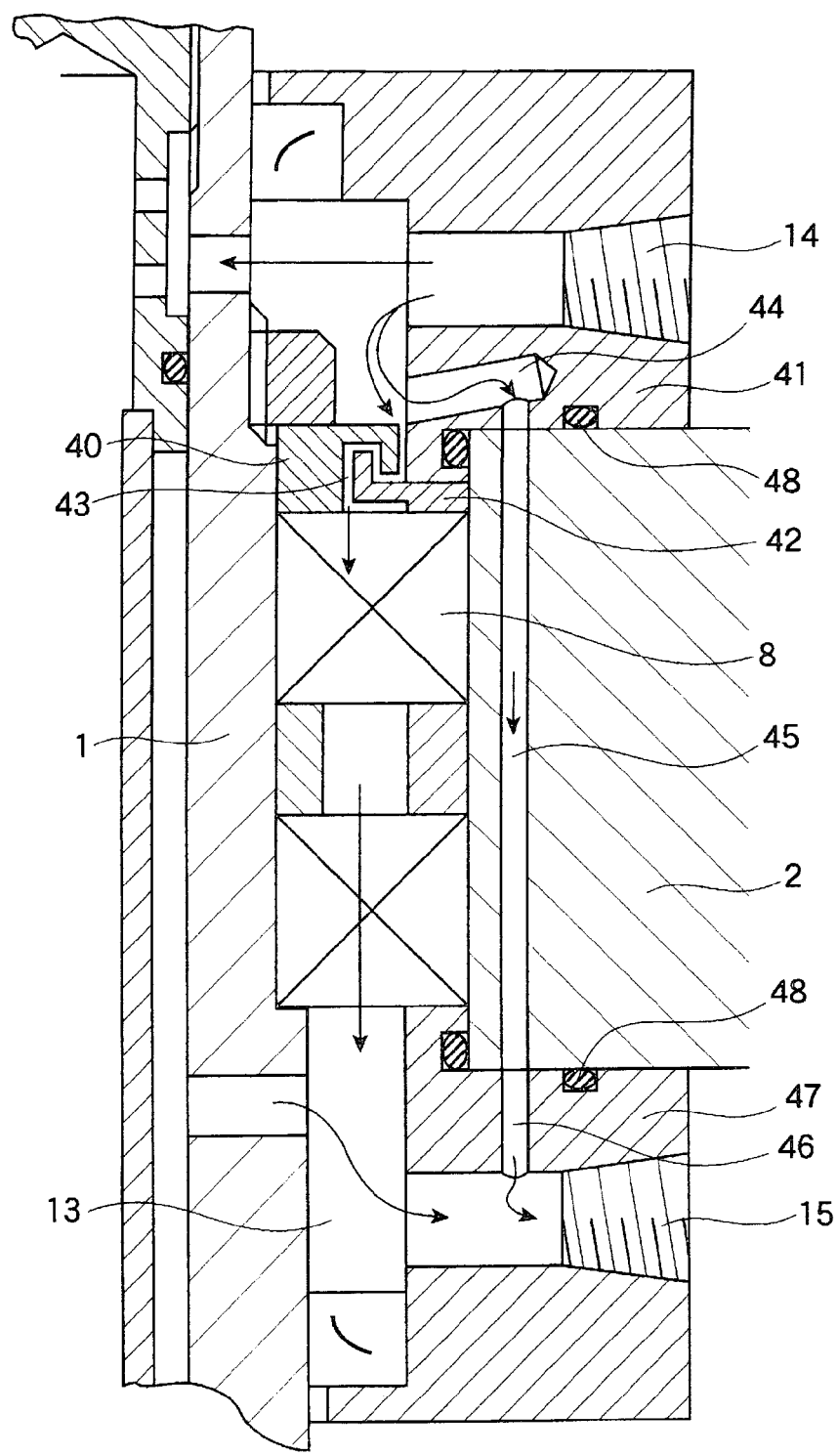
FIG. 3 is a partial cross section schematically illustrating the labyrinth structure of the regulating member and the excess lubricating oil discharge structure in another embodiment.

The lubricating oil fed through the predetermined clearance 27a to the bearing 8 is required to be a minute amount. That is because, when more than the necessary amount is supplied, the ball bearings may produce agitated heat due to the rotation. A detailed example relating to this is illustrated below in another embodiment in FIG. 3. FIG. 3 illustrates an embodiment in which the feed shaft is in the vertical (perpendicular) direction. Some of the cooling/lubricating liquid supplied form the feed port 14 is guided as the lubricating oil downward from above to the regulating member 40, as illustrated by the arrow.

The regulating member 40 has a labyrinth structure between the first cover 41 and the collar 42 inserted into the bearing 8. That is, as illustrated, part of the regulating member 40 is fitted while placed atop the collar 42, with a gap 43 between them, forming a narrow limited pathway. The extent of the gap from the labyrinth is experimental set to determine the optimal necessary lubrication level to flow through the gap. The lubricating oil passing through the labyrinth is guided through the bearing 8 to the discharge space 13.

When the feed shaft 1 is composed of a perpendicular upright shaft, this is, the axial direction of the feed shaft 1 is a plumb line, the lubricating oil is held in the top of the regulating member 40, excess oil naturally flows down, and more than the necessary amount may be supplied to the bearing 8. To avoid this, a first discharge hole 44 is provided near the regulating member 40 location of the first cover 41, a second discharge hole 45 is provided in the support 2, communicating with the first discharge hole 44, and a third discharge hole 46 is provided in the second cover 47.

The lubricating oil held at the top of the regulating member 40 is thus guided through the discharge holes 44, 45, and 46 into the discharge space 13. Doing this will allow only the necessary amount of lubricating oil to be supplied to the labyrinth structure. The positions of the discharge holes 44, 45, and 46 may also be provided downward if the feed shaft 1 is provided laterally, that is, the axial direction of the feed shaft 1 is horizontal.

In this embodiment, oil seals of o-ring 48 may also be provided in the first cover 41 and second cover 47 to prevent the lubricating oil from leaking out. Such a structure will allow excess lubricating oil to naturally flow down through the discharge holes and be discharged into the discharge space. An embodiment of the regulating member has been described above, but the structure other than the labyrinth structure, it need hardly be mentioned, is not limited to the illustrated embodiment.

What is claimed is:

1. A cooling/lubricating device for a machine tool feed shaft, comprising:
    a hollow feed shaft (1) on the outer circumference of which is formed a screw mating with a nut secured to a slide of the machine tool so as to feed the slide and which is rotatably supported at an end of the feed shaft;
    a bearing (8) which rotatably supports the end of the feed shaft (1);
    a support member (2), provided at the end of the feed shaft (1), for supporting the feed shaft (1) to be relatively rotated via the bearing (8);
    a tube (16) which is disposed along the axis inside the hollow feed shaft (1) and which allows cooling lubricant to pass through pathway spaces formed inside the tube (16) and outside the tube (16);
    a first cover member (9) which contours a feed space (12) holding the cooling lubricant fed into circumference of the feed shaft (1) at one side of the support member (2); and
    a second cover member (10) which contours a discharge space (13) holding the cooling lubricant to be discharged from circumference of the shaft (1) at the other side of the support member (2),
    a channel (27a) for the cooling lubricant as lubricant flowing outside of the feed shaft (1) from the feed space (12) through the bearing (8) to the discharge space (13); and
    a channel (20,19) for the cooling lubricant as refrigerant flowing within the feed shaft (1) from the feed space (12) to the discharge space (13),
    wherein one part of the cooling lubricant held in the feed space (12) is allowed to flow as lubricant in the axial direction of the bearing (8) outside of the feed shaft (1) and held in the discharge space (13), and wherein the other part of the cooling lubricant held in the feed space (12) is allowed to be circulated as refrigerant through the pathway spaces within the feed shaft (1) and held in the discharge space (13), so that the cooling lubricant as lubricant and the cooling lubricant as refrigerant flow through separate channels in a parallel manner respectively.

2. The cooling/lubricating device for a machine tool feed shaft according to claim 1, further comprising a regulating member (27, 40) for forming a prescribed gap (27a, 43) for supplying some of the cooling lubricant in the feed space (12) to the bearing (8) as a lubricant in a fixed amount.

3. The cooling/lubricating device for a machine tool feed shaft according to claim 2, wherein the regulating member (27, 40) is a rotating member fixed to the feed shaft (1), and forms a prescribed gap/labyrinth (27a, 43) that is spaced apart a predetermined distance from a fixing member (9, 40).

4. The cooling/lubricating device for a machine tool feed shaft according to claim 3, wherein a pathway (44) for discharging excess lubricant oil in the vicinity of the labyrinth (43) to the discharge space (13) is provided in the fixing member (41) in the vicinity the labyrinth (43).

* * * * *